United States Patent Office 3,269,557
Patented August 30, 1966

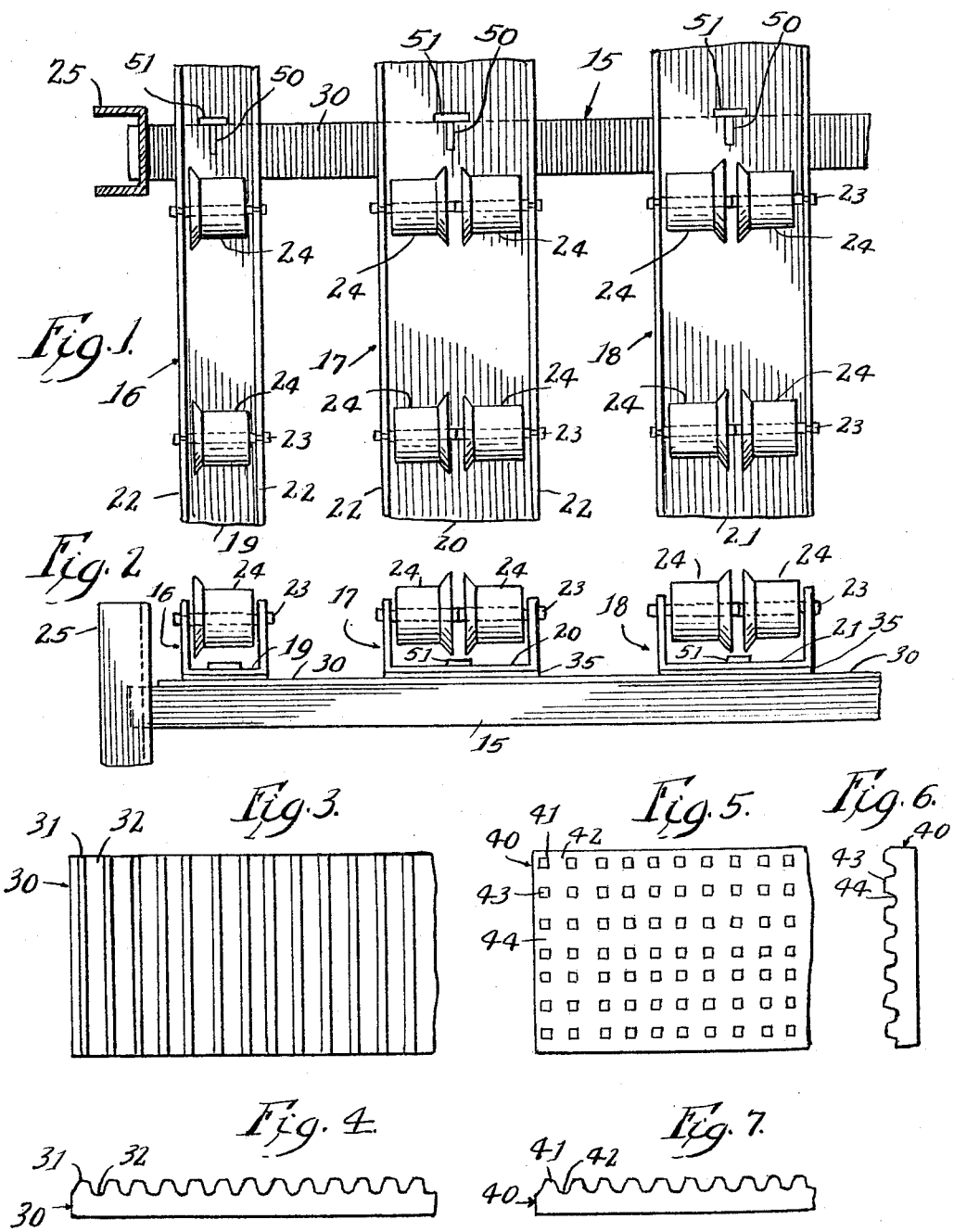

3,269,557
ADJUSTABLE STORAGE RACK AND CONVEYER
John F. Wahl, Sterling, Ill., assignor to Mallard Plastics, Inc., Sterling, Ill., a corporation of Illinois
Filed May 13, 1964, Ser. No. 367,103
4 Claims. (Cl. 211—151)

This invention relates to an adjustable storage rack and conveyer, and represents improvement on the storage rack and conveyer of my copending U.S. patent application, Serial No. 286,238, filed June 7, 1963, now U.S. Patent 3,209,879 granted Oct. 5, 1965.

The storage rack and conveyor to which the invention pertains includes a framework made up of transverse supporting members and longitudinal roller-carrying members or rails which are supported by the former. The supporting members are mounted more or less permanently on vertical posts or other suitable structure.

The roller-carrying members or rails, as mentioned, extend longitudinally of the framework, and, in the case of gravity conveyers, incline downwardly at a slight angle from rear to front. In such case, of course, the supporting members are mounted at progressively lower levels.

In many storage rack and conveyer installations there are several vertical tiers of supporting members and roller-carrying members, one above the other, thereby utilizing as much of the available space as is needed for the desired storing and conveying functions.

The supporting and roller-carrying members heretofore used have been bolted or otherwise secured together more or less permanently, thereby giving rise to a time-consuming job when it is desired to change the transverse spacing of the roller-carrying members, as is necessary from time to time when items of differing sizes are used in the rack and conveyer assembly. The job is particularly time-consuming in the case of multiple tiers, requiring disassembly and reassembly of members in comparatively inaccessible locations.

One object of the invention, therefore, is to provide a storage rack and conveyor wherein the roller-carrying members or rails are readily adjustable transversely of the assembly to accommodate items of various sizes for storage and conveying. The use of bolts or similar devices for maintaining proper relation between the supporting members and the roller-carrying members is avoided, and the latter may be moved laterally simply by lifting and replacing them at the desired new locations. The means employed for this readily adjustable relationship provide adequate transverse or lateral stability of the roller-carrying members.

Another object of the invention is to provide means insuring requisite longitudinal stability between the roller-carrying members and the supporting members. This means is installed readily without the use of tools, and its relationship with a supporting member is such that it remains in proper position during extended use of the rack and conveyer, yet allowing rapid transverse adjustment of an associated roller-carrying member.

A further object is to provide by way of modification a more or less unitary arrangement that insures both longitudinal and lateral stability of the roller-carrying members with the supporting members and yet enables ready lateral adjustability of roller-carrying members.

Other objects, advantages and features of the invention will be apparent as the description proceeds, reference being had to the accompanying drawings wherein various forms of the invention are shown. It will be understood that the description and drawings are illustrative only and that the scope of the invention is to be measured by the appended claims.

In the drawings:
FIG. 1 is a fragmentary top plan view, partly in section, of a storage rack and conveyer embodying the invention.

FIG. 2 is a front elevational view of the assembly shown in FIG. 1.

FIG. 3 is a fragmentary enlarged top plan view of stabilizing friction material applied to the upper surface of the supporting members and the lower surface of the roller-carrying members.

FIG. 4 is a front elevational view of the material shown in FIG. 3.

FIG. 5 is a fragmentary enlarged top plan view of modified stabilizing friction material used on the supporting and roller-carrying members.

FIGS. 6 and 7 are side and front elevational views of the material shown in FIG. 5.

Figure 8:
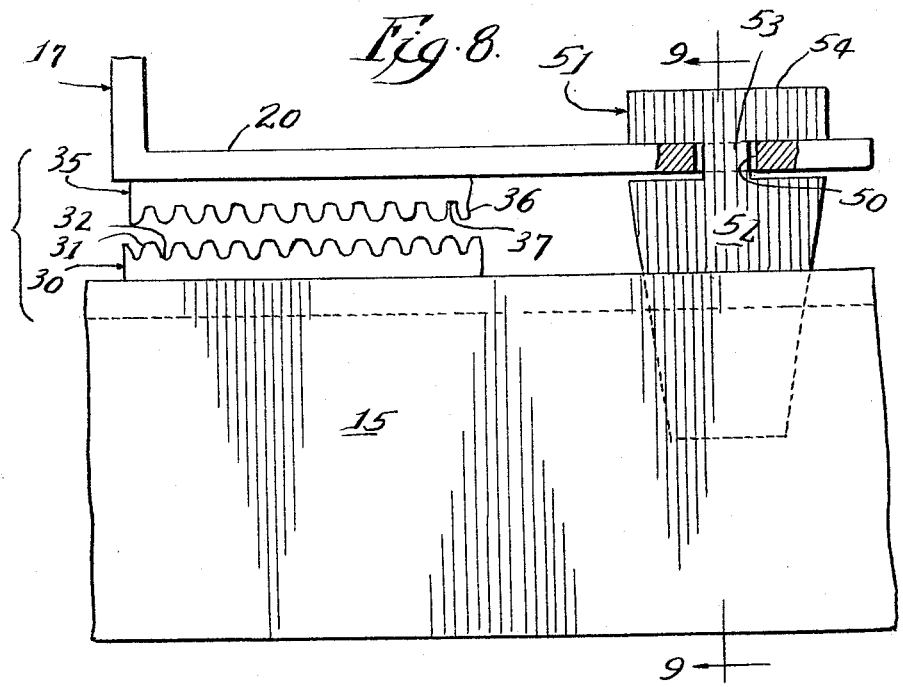
FIG. 8 is an enlarged front elevational view, partly in section, of a portion of the assembly showing means employed to insure longitudinal stability.

Referring to FIGS. 1 and 2 of the drawings, a storage rack and conveyor embodying the invention includes longitudinally spaced, transverse supporting members 15, only one of which is shown, and transversely spaced, longitudinal roller-carrying members 16, 17 and 18. The latter constitute upwardly facing channels having bottoms or webs 19, 20 and 21 and side walls 22.

Sides walls 22 carry axles 23 that in turn carry rollers 24, as described more fully in my said copending application.

Roller-carrying member 16, as shown, is an end member of the assembly, and accordingly is of such size as to carry a single roller 24 on each axle 23. Members 17 and 18 are intermediate members and accordingly have two rollers 24 on each axle 23, thus serving two adjacent storage and conveyor units.

A vertical post 25 is shown at the left end of transverse supporting member 15, it being understood that a similar post is used at the other end, and at intermediate points if necessary.

Still referring to FIGS. 1 and 2, the upper surface of supporting member 15 is provided with friction material 30 extending from end to end. In preferred form, friction material 30 constitutes a strip of rubber or like composition material that is provided with upwardly facing alternate ribs and grooves extending longitudinally of the rack and conveyor (parallel to roller-carrying members 16, 17 and 18). Ribs 31 and grooves 32 of preferred form are shown in enlarged FIGS. 3 and 4, and it will be noted that the ribs are narrower at the top than at the bottom, thereby defining grooves between them having enlarged entrances compared with the width of the rib tops.

The term "friction" is here used in a sense that refers to the characteristic of the material imparted by the alternate ribs and grooves, rather than to that imparted by the rubber or like material itself. As will be seen, the lateral stability provided by material 30 is produced by an interfitting of ribs and grooves 31 and 32 with similar ribs and grooves of cooperating material secured to the lower surface of roller-carrying members 19, 20 and 21. In other words, the use of rubber or like material, while preferred, is not essential.

Figure 9:
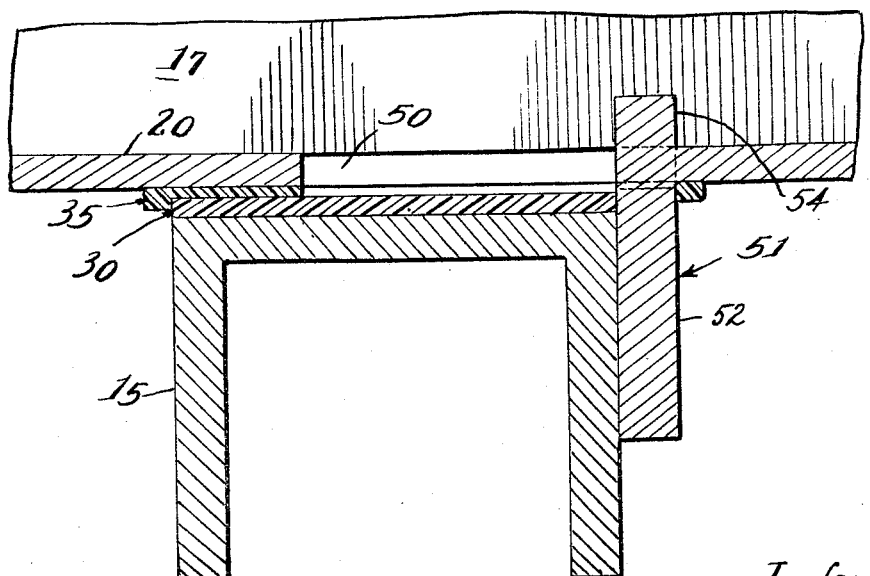
FIG. 9 is a sectional view on line 9—9 of FIG. 8.

Referring again to FIG. 2 and to FIGS. 8 and 9, friction material 35 is secured to the lower surface of roller-carrying members 16, 17 and 18 in the regions registering with supporting members 15. Material 35 has alternate ribs and grooves 36 and 37, the same as ribs and grooves 31 and 32 of material 30, and the material is mounted so that the ribs and grooves extend longitudinally.

As best indicated in FIGS. 8 and 9, a roller-carrying member such as member 17 simply can be lifted from supporting member 15 and moved to a desired position on the latter. When member 17 is lowered, ribs and grooves 36 and 37 of its associated friction material 35 interfit with ribs and grooves 31 and 32 of friction material 30 on supporting member 15, this relationship providing all the lateral stability that is required.

FIGS. 5-7 illustrate modified friction material 40 that provides both lateral and longitudinal stability of roller-carrying members 16, 17 and 18 with supporting members 15. In this form friction material 40 has longitudinal ribs and grooves 41 and 42 and transverse ribs and grooves 43 and 44. This combination of ribs and grooves, of course, produces a stipple effect wherein rib portions are spaced from each other both transversely and longitudinally and are surrounded by groove portions, as shown in FIG. 5. The friction material of this form preferably has a degree of resilience to insure proper interfitting of the ribs and grooves of the material carried respectively on supporting members 15 and roller-carrying members 16, 17 and 18.

It will be appreciated that forces tending to disturb the stability of the roller-carrying members with the supporting members are more pronounced in longitudinal direction, resulting from the movement of items in that direction and sudden stoppage of the movement. Accordingly, it often is desirable to use a more rigid means to insure longitudinal stability, particularly when friction materials 30 and 35 having only longitudinal ribs and grooves are used.

Referring to FIGS. 1, 2, 8 and 9, webs 19, 20 and 21 of members 16, 17 and 18 are provided with longitudinal slots 50 in a region generally registering with a supporting member 15. The width of slot 50 is somewhat greater than the thickness of web 19, and the slot length is such as to receive a key element, next described.

A key element 51, best shown in FIG. 8, cooperates with a slot 50, the element having a lower body portion 52, a reduced neck portion 53 and a head portion 54. Key element 51 preferably is of uniform thickness, the thickness being slightly less than the width of slot 50 and greater than the thickness of web 19.

Key element 51 is inserted in a slot 50 and rotated through ninety degrees so that body and head portions 52 and 54 retain the element in position with neck portion 53 extending through slot 50. Element 51 is moved longitudinally in slot 50 until neck portion 53 engages the web at the rear end of the slot, as shown in FIG. 9. Thereafter, the roller-carrying member is positioned longitudinally so key element 51 bears against the rear side of a transverse supporting member 15.

Forces tending to move a roller-carrying member longitudinally in forward direction will cause key element 51 to press against supporting member 15, thereby resisting any possibility that the element accidentally will rotate and drop out of the slot.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. In a storage rack and conveyer having longitudinally spaced transverse supporting members and transversely spaced longitudinal roller-carrying members supported thereby, the combination thereof with means adjustably connecting said supporting and roller-carrying members and providing lateral stability of the latter, comprising:
 friction material secured to the upper surface of said supporting members, said friction material having upwardly facing alternate ribs and grooves extending in longitudinal direction; and
 friction material secured to the lower surface of said roller-carrying members in the regions registering with said supporting members, said last friction material having alternate ribs and grooves interfitting with the ribs and grooves of the friction material on said supporting members.

2. The combination of claim 1 wherein each roller-carrying member is an upwardly facing channel having a longitudinal slot in the web thereof, with the addition of means providing longitudinal stability of said roller-carrying members comprising:
 a key element having a lower body portion, a reduced neck portion and a head portion associated with each roller-carrying member, said element of thickness less than the width of said slot and greater than the thickness of said web, said neck portion slightly longer than the thickness of said web and received within said slot, said head portion on the upper surface of said web;
 said key element positioned at the rear end of said slot and in engagement with a transverse supporting member, a force tending to displace said roller-carrying member longitudinally maintaining said key element in place.

3. In a storage rack and conveyer having longitudinally spaced transverse supporting members and transversely spaced longitudinal roller-carrying members supported thereby, the combination thereof with means adjustably connecting said supporting and roller-carrying members and providing longitudinal and lateral stability of the latter, comprising:
 resilient friction material secured to the upper surface of said supporting members, said friction material having upwardly facing longitudinal alternate ribs and grooves and transverse alternate ribs and grooves; and
 resilient friction material secured to the lower surface of said roller-carrying members in the regions registering with said supporting members, said last friction material having longitudinal and transverse ribs and grooves interfitting with the ribs and grooves of the friction material on said supporting members.

4. In a storage rack and conveyer having longitudinally spaced transverse supporting members and transversely spaced longitudinal roller-carrying members supported thereby, the combination thereof with means adjustably connecting said supporting and roller-carrying members and providing lateral stability of the latter, comprising:
 friction material secured to the upper surface of said supporting members, said friction material having upwardly facing alternate ribs and grooves extending in longitudinal direction;
 friction material secured to the lower surface of said roller-carrying members in the regions registering with said supporting members, said last friction material having alternate ribs and grooves interfitting with the ribs and grooves of the friction material on said supporting members; and
 means preventing longitudinal movement of said roller-carrying members.

References Cited by the Examiner
UNITED STATES PATENTS

| | | | |
|---|---|---|---|
| 918,039 | 4/1909 | Grundmann | 211—182 X |
| 2,950,014 | 8/1960 | Sullivan | 211—151 |
| 2,983,352 | 5/1961 | De Flora | 193—35 |
| 3,030,730 | 4/1962 | Costar | 248—23 X |
| 3,126,666 | 3/1964 | Petersen | 248—205 |

CLAUDE A. LE ROY *Primary Examiner.*

W. D. LOULAN, *Assistant Examiner.*